Nov. 22, 1927. 1,649,991
J. P. SPANG
MEAT TENDERER
Original Filed March 25, 1926  4 Sheets-Sheet 1

Inventor.
Joseph P. Spang
by Heard Smith & Tennant
Attys.

Nov. 22, 1927.

J. P. SPANG 1,649,991

MEAT TENDERER

Original Filed March 25, 1926    4 Sheets-Sheet 2

Inventor.
Joseph P. Spang
by Heard Smith & Tennant.
Attys.

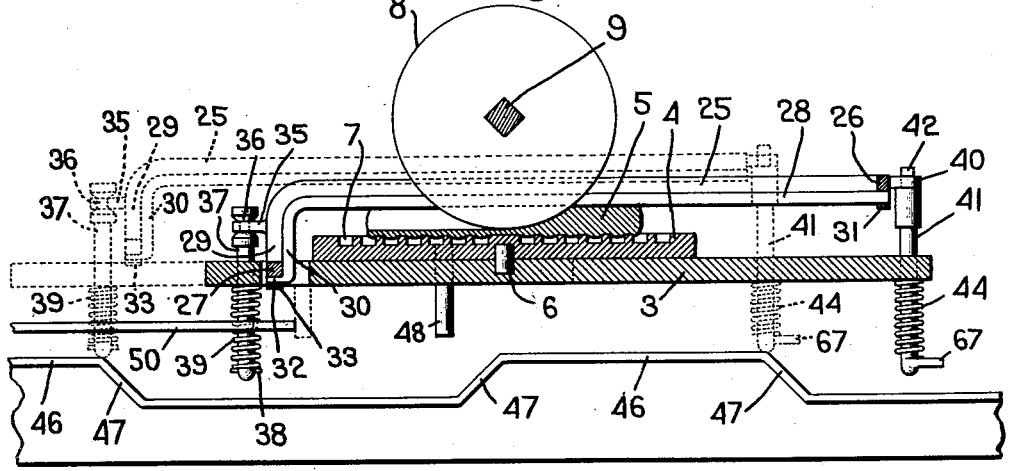
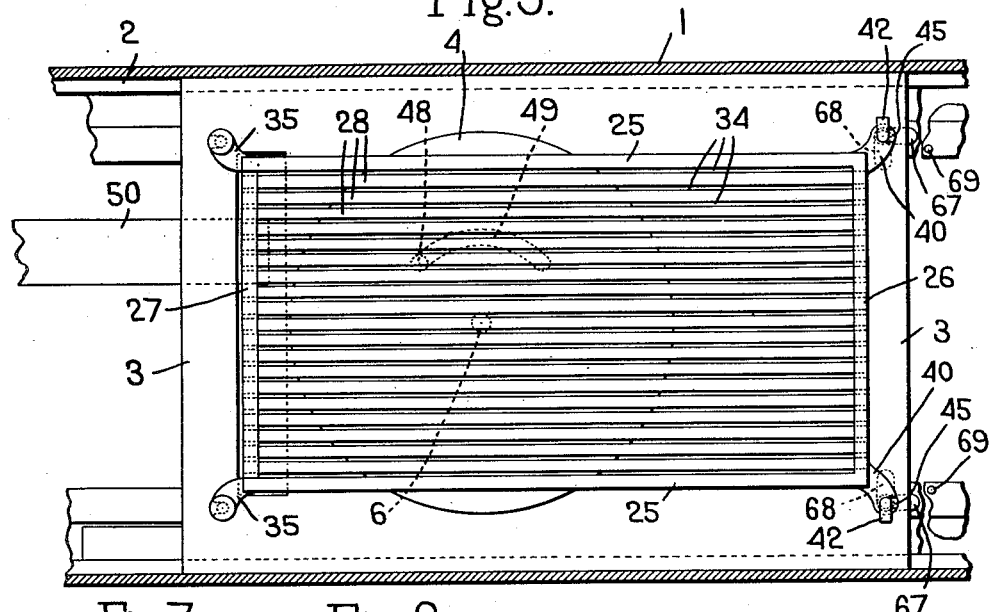
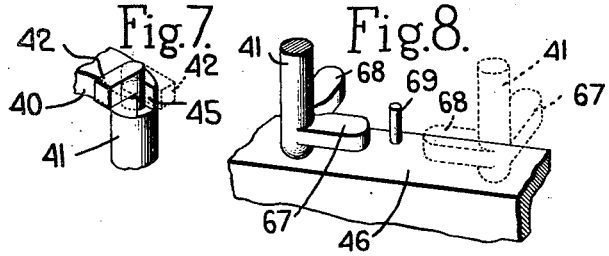

Nov. 22, 1927. 1,649,991
J. P. SPANG
MEAT TENDERER
Original Filed March 25, 1926 4 Sheets-Sheet 4

Inventor.
Joseph P. Spang
by Heard Smith & Tennant.
Attys.

Patented Nov. 22, 1927.

1,649,991

UNITED STATES PATENT OFFICE.

JOSEPH P. SPANG, OF QUINCY, MASSACHUSETTS.

MEAT TENDERER.

Application filed March 25, 1926, Serial No. 97,151. Renewed May 25, 1927.

This invention relates to a meat-tendering device of the type comprising a plurality of rotary knives, a bed reciprocating beneath the knives on which the meat to be tendered is supported and means for moving the bed beneath the knives as they are rotated thereby to cause the knives to cut slits in the meat.

One of the objects of the invention is to provide a device of this type with means for automatically turning the bed at the end of its reciprocation so that upon successive passes of the meat beneath the knives slits will be cut in the meat in different directions.

In a device embodying the invention a combined clamping member and stripper plate is employed which yieldingly holds the meat against the bed and another object of my invention is to provide an improved means for automatically releasing the clamping pressure of the combined clamping member and stripper plate when the meat is turned at the end of the stroke.

Another object of the invention is to provide a novel construction which permits the ready removal of the knives for cleaning purposes.

Another object of the invention is to provide an improved machine which can be used for slicing vegetables as well as for tendering or slicing meat.

Other objects of the invention are to provide various improvements in meat-tendering devices all as will be more fully hereinafter set forth and then pointed out in the appended claims.

In the drawings wherein I have illustrated some selected embodiments of my invention, Fig. 1 is a side view of a device made in accordance with the invention;

Fig. 4 is a section on the line 4—4, Fig. 2;

Fig. 5 is a view showing the bed, meat-supporting table and combined clamping and locking member in plan, said view showing the frame in section.

Fig. 6 is a top plan view of the table;

Fig. 7 is a perspective view illustrating the button device for locking the combined clamping member and stripping plate in position;

Fig. 8 is a fragmentary perspective illustrating the means for operating the button 42 to move it into operative position;

Figure 1:
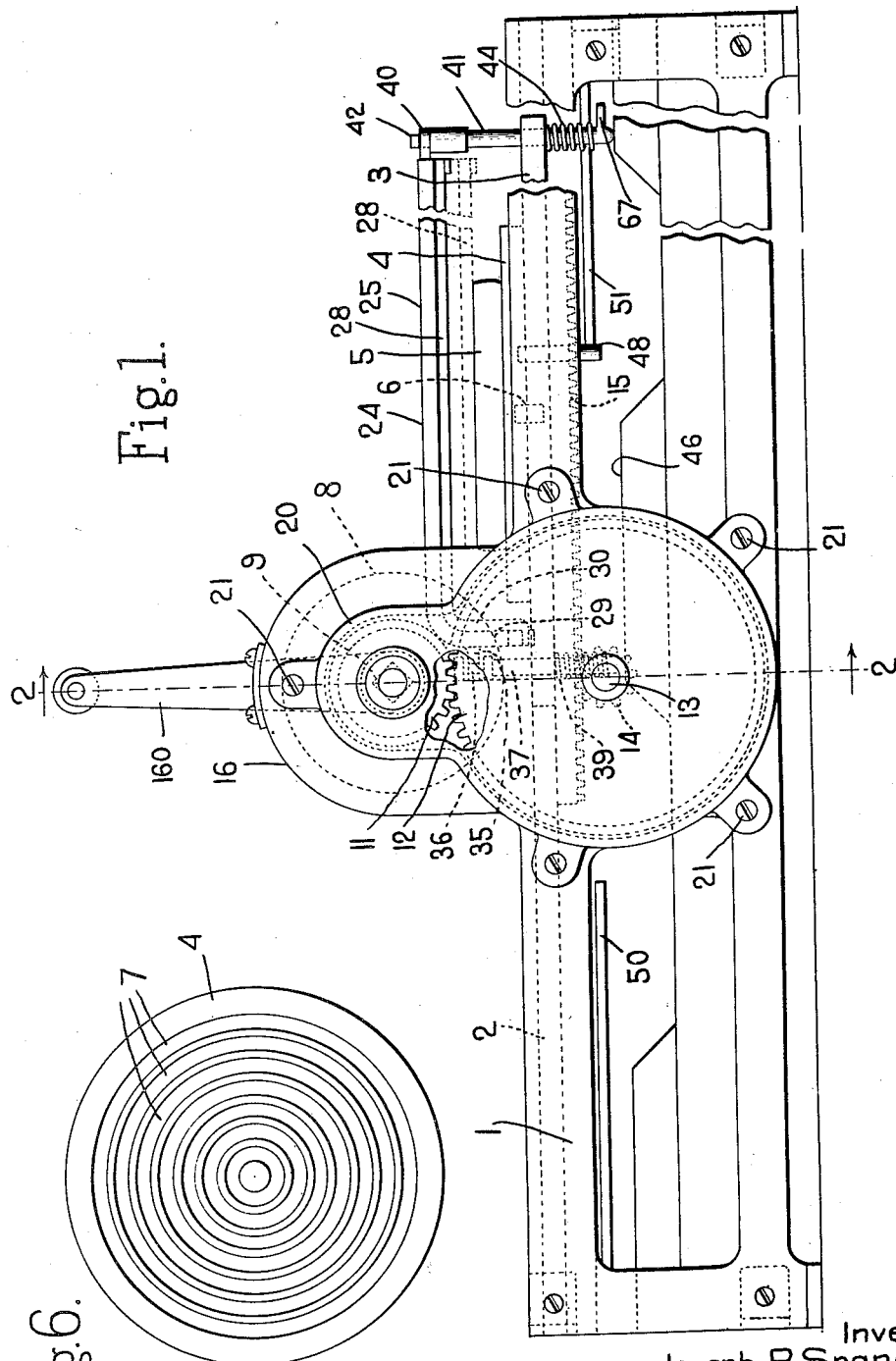
Figure 2:
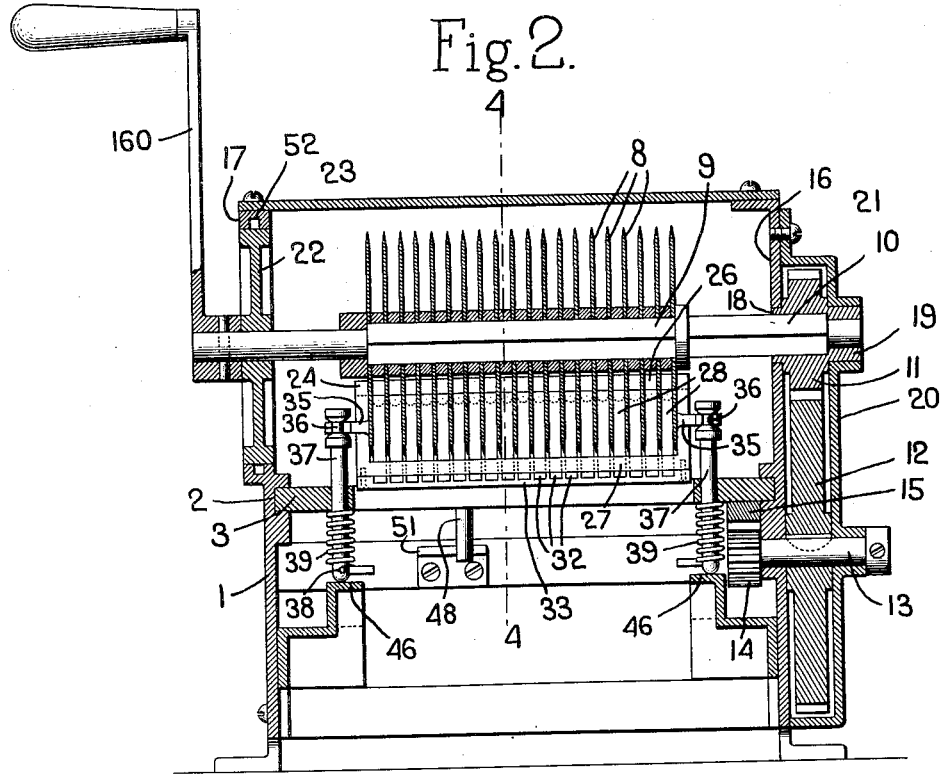
Fig. 2 is a transverse section on the line 2—2, Fig. 1.
Figure 3:
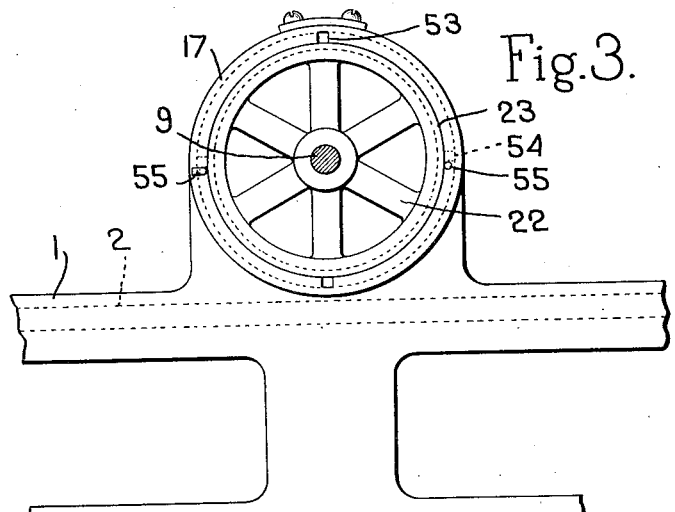
Fig. 3 is a detail view of a portion of the frame showing the construction which permits of the ready removal of the knives.

In the drawings 1 indicates the frame of the meat tenderer which is formed with ways 2 in which is slidably mounted a bed plate 3. Supported on the bed plate is a table 4 on which the meat 5 to be treated is supported. This table 4 is turnable on the bed so that the same piece of meat may be presented differently to the knives. For this purpose the table is provided with a central spindle 6 which is received in a recess in the bed and forms a pivot about which the table may be turned. The top surface of the table is preferably provided with annular grooves 7 to assist in holding the meat 5 firmly in place.

Situated above the bed are a plurality of rotary knives 8, said knives being rigidly secured on a knife shaft 9. The knife shaft is journalled in the frame and so positioned that the upper surface of the table 4 is situated just below the lower edge of the knives so that when a slice of meat 5 is placed on the table and the bed is reciprocated the knives will slit the meat but will not cut clear through. Means are provided for rotating the knives and also for simultaneously reciprocating the bed 3, and the means by which the knives are rotated are constructed so as to permit them to be readily removed from the frame when it is necessary to clean them.

As herein shown the end 10 of the knife shaft 9 is squared and fits into an axial recess formed in a pinion 11 which is journalled in the frame. This pinion in turn meshes with a gear 12 mounted on a shaft 13 that is journalled in the frame, said shaft having a gear 14 fast thereon which meshes with a rack 15 on the under side of the bed. The knife shaft 9 is also provided with a crank handle 160 by which it may be rotated and with this construction the turning of the crank handle 160 will rotate the knives and will operate through the gears 11, 12, 14 and 15 to move the bed 3 in its ways 2.

The frame 4 is formed with two upstanding extensions 16 and 17. The gear 11 is shown as having on one side a hub 18 which finds a bearing in the upright 16 and on the other side it has a hub 19 that finds bearing in a cover plate 20 which encloses the gears 11 and 12 and is secured to the frame by suitable screws 21. The shaft 13 also finds its bearing in the side of the frame and the cover plate 20.

The upright extension 17 has an opening 23 in which is received a movable bearing member 22 in disk form, said bearing member constituting a bearing for the crank handle end of the knife shaft 9. The bearing disk 22 is removably retained in the opening 23 for the purpose of permitting the knives to be readily removed as will be presently described.

The meat 5 is retained in place on the table 4 by a combined clamping member and stripping plate indicated generally at 24. This clamping and stripping member comprises a frame having the two sides 25, which are connected by the end pieces 26, 27 and a plurality of stripper and clamping bars 28 which extend between the end pieces 26, 27 and are secured thereto. The side members 25 of the frame are bent downwardly at their rear ends as shown at 29 and the clamping bars 28 have a similar shape, they being curved or bent downwardly at their rear end as shown at 30. The front ends of the bars 28 rest against the under side of the cross piece 26 and are secured thereto by a clamping strip 31 which is screwed or otherwise fastened to the frame and which extends underneath the ends of the strips 28. At the rear end each member 28 is bent backwardly as shown at 32 to form a finger which underlies the cross piece 27, said fingers 32 being clamped to the under side of the cross piece by a clamping strip 33. With this construction there will be formed a plurality of slits 34 between the individual bars or strips 28 and these slits 34 are of proper dimension to receive the knives 8. At the rear end of the clamping member is provided with two forked arms 35, the forks of which engage in grooves 36 formed in two retaining pins 37 that extend through the bed 3 and are movable vertically therein. The lower end of each retaining pin 37 has a collar 38 thereon and a spring 39 encircles each retaining pin and is inserted between the collar and the under side of the bed, said springs tending to move the retaining pins downwardly.

At the front end the frame 25 is formed with two other forked arms 40 which co-operate with locking members 41. Each member 41 is in the form of a pin which extends through the bed 3 and is slidable vertically therein and is provided at its upper end with a button portion 42.

Each locking member 41 is turnable about its axis so as to place the button either in its operative position in which it overlies one of the arms of the fork 40 as shown in Fig. 7, (this being the operative locking position of the locking member) or in position in alignment with the opening 45 between the arms of the fork as shown by dotted lines Fig. 7, (this being the inoperative or unlocked position of the button). Each locking pin is also acted on by a spring 44 which co-operates with the springs 39 to hold the combined stripper plate and locking member yieldingly against the meat 5 as will be presently set forth. With this construction the combined clamping member or stripper plate can be readily removed and replaced in position.

When a piece of meat 5 is to be slit the bed 3 will be moved forward into the position shown in Fig. 1 and then a piece of meat may be placed on the table 4. The combined clamping member and stripper plate is then put in position the forked arms 35 first being engaged with the recesses 36 and then the front end of the stripper plate being swung downwardly into contact with the meat. At this time the buttons 42 are turned into the dotted line position so that the forked arms 40 may pass down over the buttons, the latter passing up between the arms of the forks. The locking members 41 are then turned to bring the button into its locking position shown in full lines Fig. 7 and when in this position the springs 44, 39 will hold the combined stripper and clamping member yieldingly against the work. The purpose of making the clamping and stripper member with the downwardly curved ends 29, 30 is so as to bring the rear cross bar 27 below the knives 8. This permits the button and table to be moved forwardly into the position shown in Fig. 1 and in position in which the knives will not interfere with the removal of the clamping and stripper member or its replacement in the machine. The combined clamping and stripper member may be removed as will be obvious by simply bringing the table into the position shown in Fig. 1 and then turning the locking member 41 into unlocking position after which said combined clamping and stripper member may be taken out of the machine.

In the present invention means are provided whereby the table 4 is turned at each end of the travel of the bed 3 and in order to permit the free turning of the table means are provided for raising the combined clamping and stripper member when the bed reaches each end of its stroke thereby to lift said clamping member off from the meat. Various means may be provided for thus lifting the clamping member. In Figs. 1 and 4 the frame is provided with raised tracks 46 having cam approaches 47 thereon.

As the bed plate 3 approaches the limit of its travel in either direction the lower ends of the pins 37, 41 ride up the inclines 47 onto the raised tracks 46 thus positively raising the combined clamping and stripping member from contact with meat as shown by dotted lines Fig. 4.

I have also provided means for automatically unlocking the locking members 41 at each end of the travel of the bed and for locking said members again after the table has been turned and when the bed has its initial movement. For this purpose each pin 41 is provided at its lower end with two arms 67, 68 situated at right angles to each other. These arms co-operate with a stationary pin 69 carried by the frame. Assuming for instance, that the full line position of the arms 67, 68 in Fig. 8 corresponds to the full line position of the locking button 42 in Fig. 7 it will be seen that as the bed moves to the right from the full to the dotted line position Fig. 8 the arm 68 will engage the pin 69 and this engagement will turn the locking pin 41 through 90° thus releasing the button 42 from locking engagement with the arm 40. When the locking member 41 reaches the dotted line position Fig. 8 the arms 67, 68 will have the position shown in dotted lines, this being a position corresponding to the end of the stroke. As the bed starts in the reverse direction or toward the left, Fig. 8, the arm 67 will engage the pin 69 and will restore the parts to the full line position as the pin 41 passes the pin 69 thus automatically bringing the locking button 42 into locking engagement with the arm 40.

Figure 9:
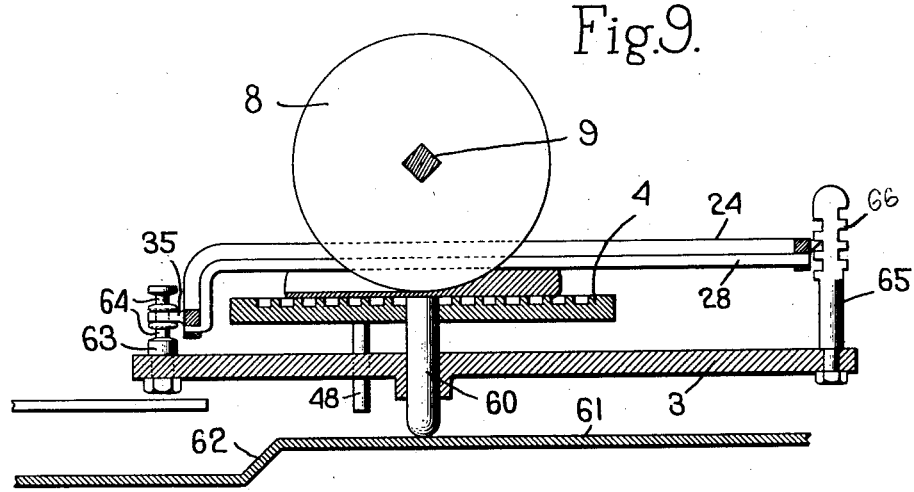
Fig. 9 is a view similar to Fig. 4 but illustrating a different embodiment of the invention.

In Fig. 9 I have illustrated a different embodiment of the invention wherein instead of securing a separation of the combined clamping and stripping member from the meat by raising said clamping and stripping member this separation is secured by depressing the table 4. In this embodiment the table 4 has a pivot pin or shaft 60 fast thereto which extends entirely through the bed 3 and which is adapted to rest and travel on a track 61 formed on the frame. This track is so arranged that when the table 4 is passing beneath the knives 8 the table will be raised from the bed 3 as shown in Fig. 9. As the bed 3 approaches either end of the limit of its movement the pivot pin 6 will pass off from the track 61 and the table will then gravitate onto the bed 3, such downward movement of the table separating the meat from the combined clamping and stripper member. At each end of the track 61 is an incline approach 62 so that as the bed begins its initial movement in either direction the pin 60 rides up one of the approaches 62 onto the track 61 thus elevating the table and bringing the meat into firm clamping engagement with the combined clamping and stripper plate. In this embodiment the retaining and locking pins need not be yieldingly mounted. In Fig. 9 the retaining pins at the rear end of the combined clamping and stripping member are indicated at 63, they being in the form of posts which are rigidly secured to the bed 3. Each retaining pin has a plurality of grooves 64 therein into anyone of which the forked arms 35 may be placed. At the front the locking pins are indicated at 65, each being secured to the bed 3 but turnable therein.

Each locking pin is provided with a plurality of arms 66, said arms being spaced apart a distance equal to at least the thickness of the forked arms 40. With this arrangement the combined clamping and stripping member 24 may be secured to the retaining and locking pins at different vertical positions depending upon the thickness of the meat 5 which is to be treated.

For turning the table 4 at each end of the stroke the latter is formed with a pin 48 depending therefrom and operating in an arcuate slot 49 formed in the bed 3. This pin is adapted to engage either one of two strikers 50, 51, one situated at each end of the frame. The arrangement is such that the pin 48 will engage a striker just before the bed reaches the limit of its movement in either direction. The further or final movement of the bed after the pin his engaged the striker will cause the table to turn. The arrangement herein shown is such that the table will make a quarter turn.

With this arrangement, therefore, the table will be automatically turned through 90° at each end of the travel of the bed and during the turning movement the combined stripper and clamp plate will be separated from the meat.

I have referred above to the knives 8 being removable. To remove the knives the bed plate will be carried to its forward limit as shown in Fig. 1 and the combined stripper and clamping member may then be removed after which the bearing member 22 will be removed from the opening 23 and the gang of knives on the knife shaft withdrawn through said opening 23, the latter being big enough to permit the knives to pass therethrough. When the knives are thus removed the squared end 10 of the knife shaft is merely withdrawn from the gear 11. The knives may be replaced by inserting them through the opening 23, entering the squared end 10 of the shaft 9 into the socket of the gear 11 and then replacing the bearing member 22 in the opening 23. It will be understood, of course, that the bearing member 22 remains on the knife shaft when the knives are removed.

For holding the bearing member 22 in place I have formed the wall of the opening 23 with a groove 52 having two openings 53 leading thereto. The bearing member 21 is provided with two radially-extending pins 54 adapted to enter the groove 52 through the openings 53. After the pins have thus been entered into the groove the bearing member may be turned to carry the pins out of alignment with the openings 53. If desired, the bearing member 22 may be locked from turning movement by two locking pins 55 which are removably inserted transversely into openings formed in the extension 17 which by their engagement with the pins 54 serve to hold the member 52 from rotation.

Figure 10:
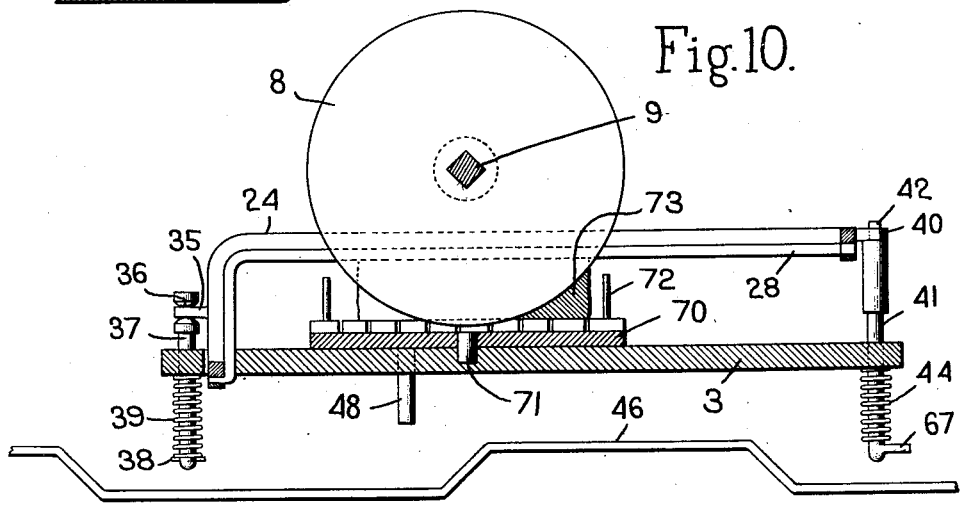
Fig. 10 is a view similar to Fig. 9 but illustrating a device as adapted for slicing vegetables rather than slicing meat.
Figure 11:
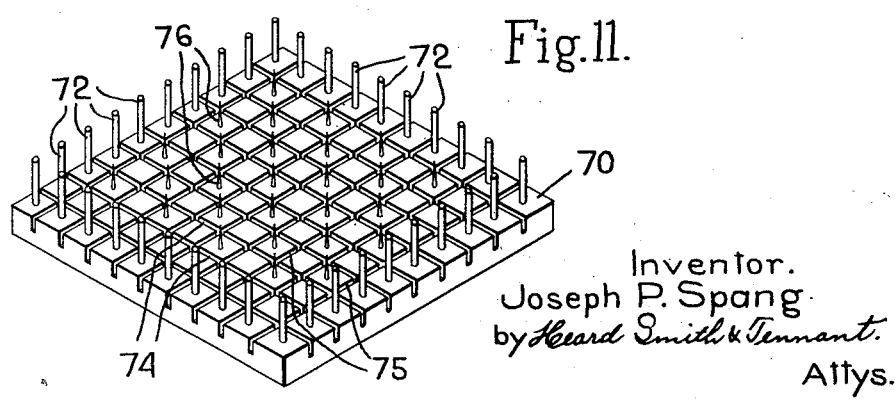
Fig. 11 is a view of the turntable used in slicing vegetables.

In Figs. 10 and 11 I have illustrated a construction adapted for slicing vegetables rather than cutting meat. To convert the device for slicing vegetables into a vegetable slicer it is only necessary to remove the table 4 and replace it with a table 70 of special construction. The table 70 is provided with the central pivot pin 71 by which said table is pivotally mounted on the bed 3 and it is provided with a plurality of pins 72 rising therefrom around its periphery, these pins being for the purpose of retaining the vegetables 73 on the table during the slicing operation. The table is provided with grooves 74 extending diametrically thereacross in one direction and other grooves 75 extending diametrically thereacross in an opposite direction. In a vegetable slicer the tables and knives have such a relative arrangement that the knives will cut clear through the vegetables 3, the periphery of the knives travelling in the slots 74, 75. The pins 72 will be spaced so that they will pass between the knives during the slicing operation.

The table 70 is provided with the depending pin 48 by which the table is turned at each end of the stroke and the purpose of having two sets of grooves 74, 75 is that there will be one set in operative position in both positions of the turntable.

I claim—

1. In a meat-tendering device, the combination with a plurality of rotary knives, of a meat-supporting table mounted for reciprocation beneath the knives, means to rotate the knives and reciprocate the table simultaneously, and means to turn the table automatically at the end of the reciprocatory movement thereof.

2. In a meat-tendering device, the combination with a plurality of rotary knives, of a meat-supporting table mounted for reciprocation beneath the knives, means to rotate the knives and reciprocate the table simultaneously, and means actuated by the reciprocating movement of the table to turn the latter at the end of the reciprocation.

3. In a device of the class described, the combination with a plurality of rotary knives, of a bed situated to support meat to be tendered, means to rotate the knives and simultaneously move the bed longitudinally thereby to pass the meat beneath the knives, and means for automatically turning the meat after it has been acted on by the knives.

4. In a device of the class described, the combination with a plurality of rotary knives, of a bed situated to support meat to be tendered, means to rotate the knives and simultaneously move the bed longitudinally thereby to pass the meat beneath the knives, and means actuated by the movement of the bed to turn the meat.

5. In a meat tenderer, the combination with a plurality of rotary knives, of a bed mounted for reciprocation beneath the knives, a meat-carrying table revolubly mounted on the bed, means to rotate the knives and simultaneously reciprocate the bed beneath the knives, and means for automatically turning the table on the bed at each end of the reciprocatory movement of the latter.

6. In a meat tenderer, the combination with a plurality of rotary knives, of a bed mounted for reciprocation beneath the knives, means for rotating the knives and simultaneously reciprocating the bed, a meat-supporting table mounted on the bed and adapted to turn thereon, said bed having a slot, a pin depending from the bed through said slot, and strikers with which the pin engages at each end of the reciprocating movement of the bed thereby to turn the table on the bed.

7. In a meat tenderer, the combination with a plurality of rotary knives, of a meat-supporting member on which the meat to be tendered is supported, a combined clamping and stripping member yieldingly holding the meat in place, means to rotate the knives and to give the knives and bed a relative movement to cause the knives to slit the meat, means for releasing the clamping pressure of the stripping plate at the end of such relative movement, and means for turning the meat.

8. In a meat tenderer, the combination with a plurality of rotary knives, of a reciprocating bed beneath the knives and on which meat to be tendered is supported, a combined clamping and stripper member for holding the meat while acted on by the knives, means to rotate the knives and simultaneously reciprocate the bed, means to release the clamping pressure of the clamping member on the meat at each end of the reciprocatory movement of the bed, and means to turn the meat while the clamping pressure is released.

9. In a meat tenderer, the combination with a plurality of rotary knives, of a bed for supporting the meat to be tendered, means to rotate the knives and simultaneously reciprocate the bed beneath the knives, a clamping member for clamping the meat in position on the bed, means operated by the movement of the bed to release the clamping member at the end of the reciprocatory movement and turn the meat.

10. In a device of the class described, the combination with a plurality of rotary knives, of a bed mounted for reciprocation beneath the knives, a table mounted on the bed for turning movement, means for rotating the knives and simultaneously reciprocating the bed, and means actuated by the movement of the bed to turn the table on the bed at the end of the reciprocation.

11. In a device of the class described, the combination with a plurality of rotary knives, of a reciprocating bed beneath the knives, a table on the bed adapted to have turning movement thereon, a clamping member for clamping the material to be slit to the table, means for rotating the knives and simultaneously reciprocating the bed, means operative at the end of the reciprocation to relieve the clamping pressure of the clamping member and turn the table on the bed.

In testimony whereof, I have signed my name to this specification.

JOSEPH P. SPANG.